United States Patent [19]

Kaminski

[11] Patent Number: 4,737,099
[45] Date of Patent: Apr. 12, 1988

[54] APPARATUS FOR APPLYING LABELS TO BLOW MOLDED ARTICLES

[75] Inventor: Ronald S. Kaminski, Bowling Green, Ohio

[73] Assignee: Owens-Illinois Plastic Products Inc., Toledo, Ohio

[21] Appl. No.: 66,421

[22] Filed: Jun. 25, 1987

[51] Int. Cl.⁴ ............................................. B29C 49/24
[52] U.S. Cl. .................... 425/504; 264/509; 271/31.1; 271/271; 294/64.1; 425/522; 425/126.1
[58] Field of Search .............................. 264/509, 516; 425/126 R, 503, 504, 522, 539, 540; 271/31.1, 271; 414/744 B; 294/64.1

[56] References Cited

U.S. PATENT DOCUMENTS

4,636,166  1/1987  Franks et al. ..................... 425/504

*Primary Examiner*—Jay H. Woo
*Assistant Examiner*—Timothy W. Heitbrink

[57] ABSTRACT

In the making of hollow plastic articles wherein a label is positioned in each of a plurality of spaced partible molds in a predetermined array, a preform is positioned in each set of partible molds and the molds are closed and the preform is blown outwardly to the confines of the mold to apply the label to the resultant hollow plastic article, the apparatus for removing the labels from a conveyor and applying them to the open partible molds which comprises a vacuum head supported for movement between a position for picking up a label and a position for delivering a label to a partible mold. The head comprises an elongated body and a plurality of longitudinally spaced vacuum cups along the body. The body has a transverse cross sectional surface that generally conforms to the cross section of the internal surface of the mold to which the label is to be applied. The outer surface of the body is formed with a layer of resilient material with the vacuum cups projecting slightly beyond the outer surface of the layer.

16 Claims, 9 Drawing Sheets

APPARATUS FOR APPLYING LABELS TO BLOW MOLDED ARTICLES

This invention relates to the application of labels to hollow blown plastic articles.

BACKGROUND AND SUMMARY OF THE INVENTION

In the making of hollow blown plastic articles such as containers, it has heretofore been suggested that labels be held in one or more of the mold sections by vacuum so that when the parison is blown outwardly into conformity with the cavity, the label becomes adhered or bonded to the article.

The molds are often provided in a plurality of sets of partible molds in a predetermined array and, in order to delivery the labels, a plurality of magazines are provided, one for each mold half, and an associated plurality of pick-up and delivery devices function to remove labels from the magazines and deliver them to one or both of the mold halves of each set.

As set forth in U.S. Pat. No. 4,636,166, having a common assignee with the present application, an apparatus is provided wherein labels are successively removed from a label magazine and positioned in an array which corresponds in spacing to the spacing of the sets of molds. The labels are then simultaneously moved in the array from the first position to a second position within the open partible molds and deposited in the molds. The apparatus comprises a magazine for supporting labels in a stack and an endless belt transfer device positioned adjacent the magazine. The belt is indexed in predetermined spaces corresponding to the spaces of the array of molds. A label pick-up device removes a label from the magazine and deposits it on the conveyor so that the spacing between the labels on the endless transfer conveyor corresponds to the spacing between the sets of molds. Another label deposit device removes the labels simultaneously from the endless transfer conveyor and delivers them between the open partible molds.

In copending application Ser. No. 054,928, filed May 28, 1987, having a common assignee with the present application, a method and apparatus is disclosed which comprises providing labels on a roll of labels, successively engaging the free end of the web of the roll of labels by a first endless vacuum conveyor, tensioning the portion of the web between a point upstream and the free end by the first endless vacuum conveyor, successively cutting a label on the free end from the remaining tensioned portion, transferring each label successively by moving the first endless conveyor adjacent a second endless vacuum conveyor which is transverse to the first conveyor, indexing the second endless conveyor to provide an array of labels on the second endless conveyor which corresponds in spacing to the spacing of the array of molds, engaging the array of labels and moving them from a first position adjacent said second conveyor to a second position within the partible molds and depositing the labels in the molds.

In the handling of the labels for transfer between the endless conveyor and open partible molds, difficulties are encountered especially where the labels are made of a material such as plastic.

Among the objectives of present invention are to provide an apparatus including a pickup and delivery device which will effectively hold the label and prevent it from becoming folded or deformed during the handling; which apparatus is simple and can be readily manufactured and maintained.

In accordance with the invention, the apparatus for removing the labels from a conveyor and applying them to the open partible molds which comprises a vacuum head and means for supporting the head for movement into a position for picking up a label and delivering a label to a partible mold. The head comprises an elongated body and a plurality of longitudinally spaced vacuum cups. The body has a transverse cross sectional surface that generally conforms to the cross section of the internal surface of the mold to which the label is to be applied. The outer surface of the body is formed with a layer of resilient material with the vacuum cups projecting slightly beyond the outer surface of the layer.

DESCRIPTION

Figure 1:
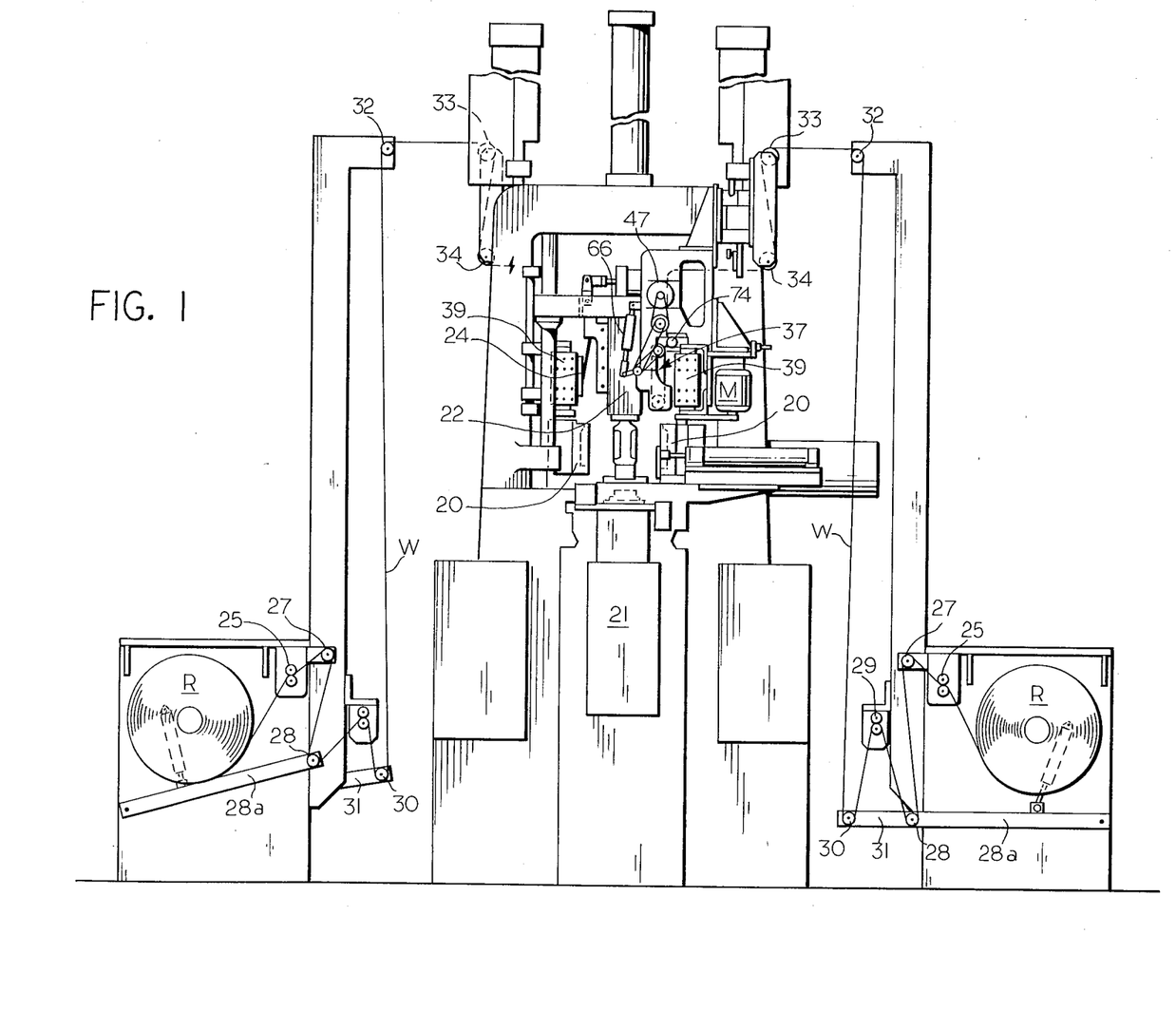
FIG. 1 is a side elevational schematic view of a blow molding apparatus embodying the invention.
Figure 2:
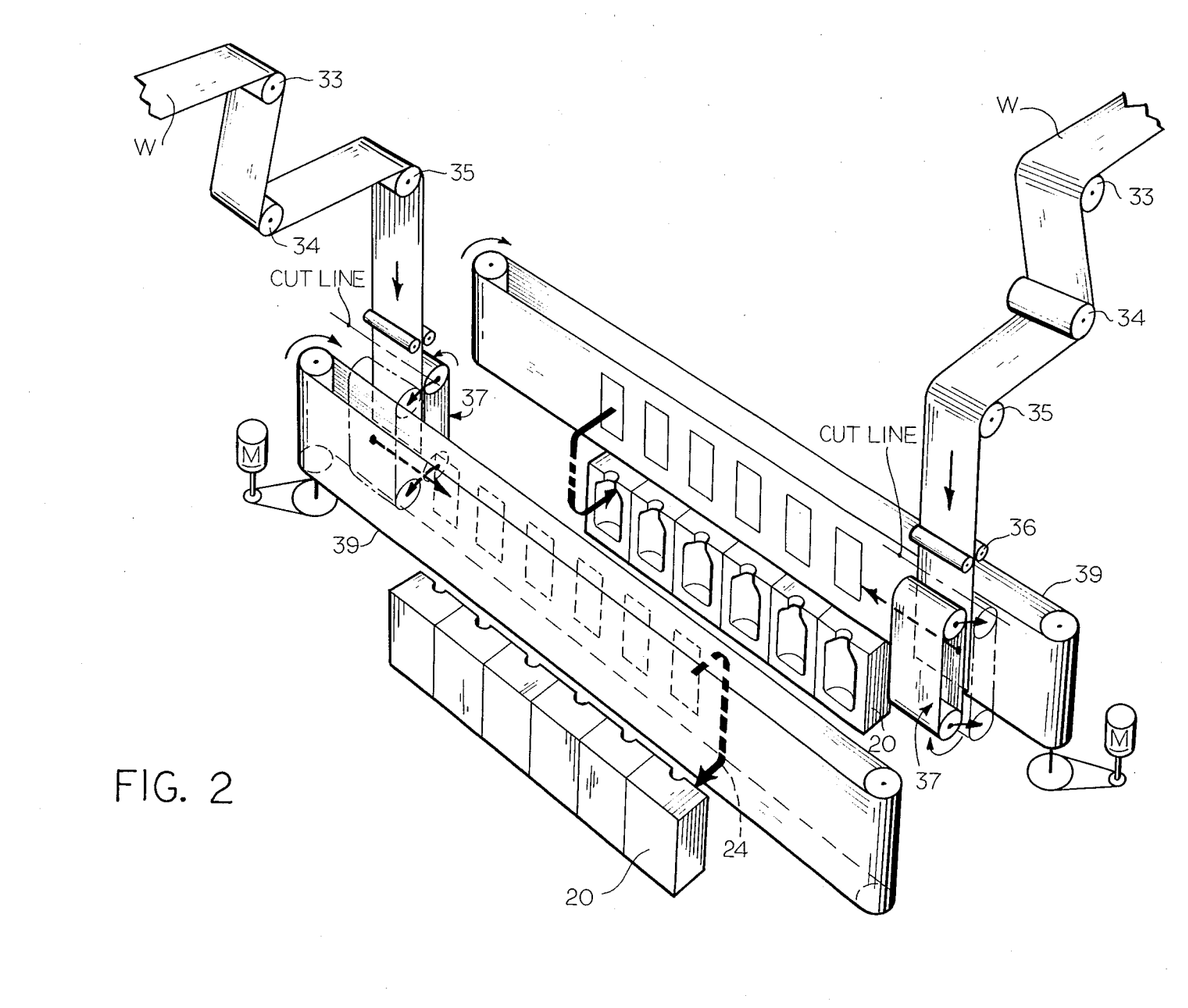
FIG. 2 is a fragmentary perspective schematic view of the apparatus.
Figure 3:
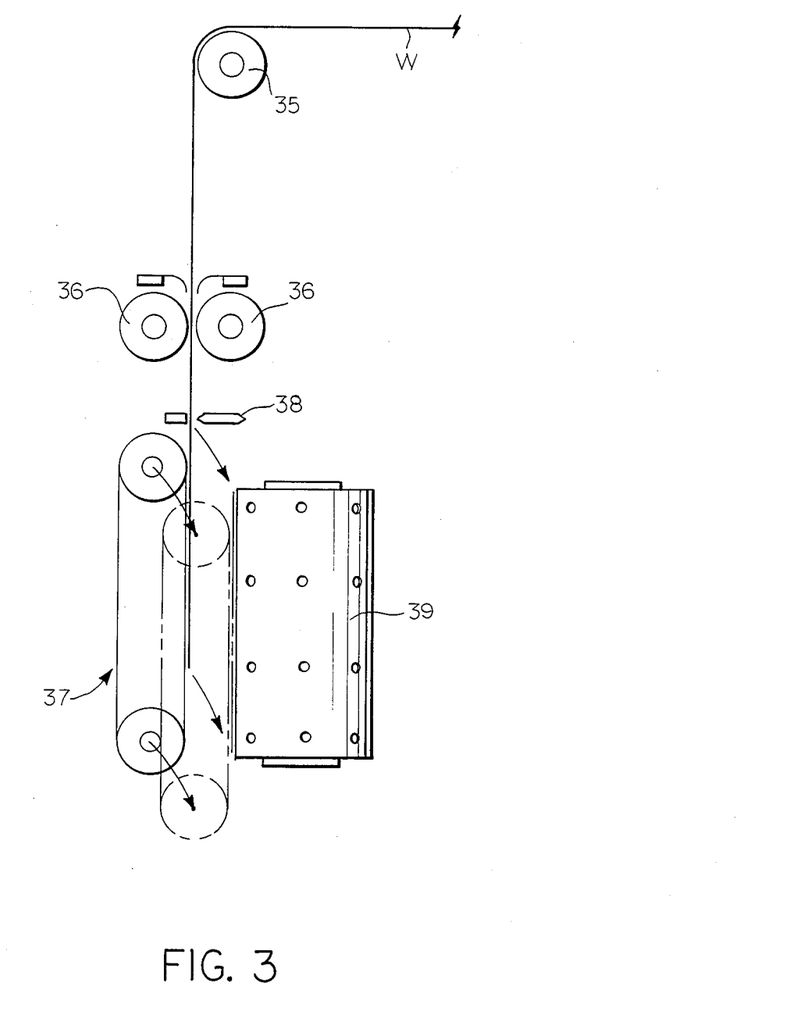
FIG. 3 is a fragmentary elevational schematic of a portion of the apparatus.

Referring to FIGS. 1 and 2, the invention relates to blow molded plastic articles such as containers wherein labels are applied to sections of a set of molds and the mold sections are closed and a heated parison or preform is blown outwardly into conformity with the mold sections causing the labels to be adhered or bonded to the blown articles.

In one type of apparatus to which the invention relates, the apparatus includes a plurality of sets of partible molds 20 in a linear array, that is, in side-by-side relationship. An extruder 21 is associated with each set of molds and a head 22 is moved downwardly to receive the end of an extruded tube in a neck mold in the head which is then drawn upwardly to position a preform or parison between the mold sections 20. The mold sections are then closed and the article blown to the desired configuration within the confines of the mold. Where a label is to be applied, the head 22 supports label deposit devices 24 as hereinafter described which deliver labels to the mold sections. If only one label is to be applied, a single deposit device 24 is provided for each set of molds.

Labels are provided on the webs W of a roll R of label material such as plastic or paper on each side of the machine. The end of each web W is trained between a first set of driven rollers 25 over an idler roller 27 and then under a roller 28 on a pneumatically operated dancer arm 28a, then between a second set of driven pinch rollers 29, and then under an idler roller 30 on a dancer arm 31. The web W passes from idler roller 30 upwardly over an idler roller 32 and horizontally over an idler roller 33, vertically to an idler roller 34 and then horizontally to an idler roller 35 and then downwardly between driven pinch rollers 36, on each side of the machine. The free end of the web W is then engaged by an endless vacuum conveyor 37 which applies tension on the portion of the web between the driven rollers 36 and the conveyor 37. A knife assembly 38 can be actuated to sever the label from the portion under tension. The endless conveyor 37 then continues to operate until the label is centered on the endless conveyor 37. Thereafter, the endless conveyor 37 is moved bodily to bring the label adjacent an endless vacuum transfer conveyor 39 that extends horizontally. Endless transfer conveyor 39 is indexed horizontally relative to its respective conveyor 37. Successive labels are similarly severed and delivered to the conveyor 39 to provide an array of labels on the conveyor 39 corresponding to the number of cavities defined by mold sections 20 of the blow molding machine. Thereafter, the label deposit devices 24 function to remove the labels from the conveyor 39 and deposit them in the respective cavities of the mold sections 20. The endless conveyor 37 is driven intermittently by a motor M such as a stepping motor.

The aforementioned apparatus is disclosed and claimed in the aforementioned application Ser. No. 054,928, filed May 28, 1987, which is incorporated herein by reference.

The present invention is directed particularly to the pickup and delivery devices for removing labels from the endless conveyor 39 and delivering them to the open partible molds.

Referring to FIGS. 4-8, a plurality of pickup devices 40 are provided on each side of the head 22 in an array on each side corresponding to the number of labels to be delivered to each array of molds. Each vacuum device 40 comprises a body 41 having the general curvature corresponding to the transverse curvature of the mold to which the label is to be applied and extending axially. A block 42 is associated with the body 41 and a plurality of resilient vacuum cups 43 are mounted in the body 42 and project through a longitudinally spaced opening 44 in the body. The body 41 further includes a layer 45 of resilient material on the surface thereof. The layer 45 preferably comprises closed cell foam material having a durometer of 30-40 on the A scale. A preferred material comprises foam neoprene.

Figures 5, 6:
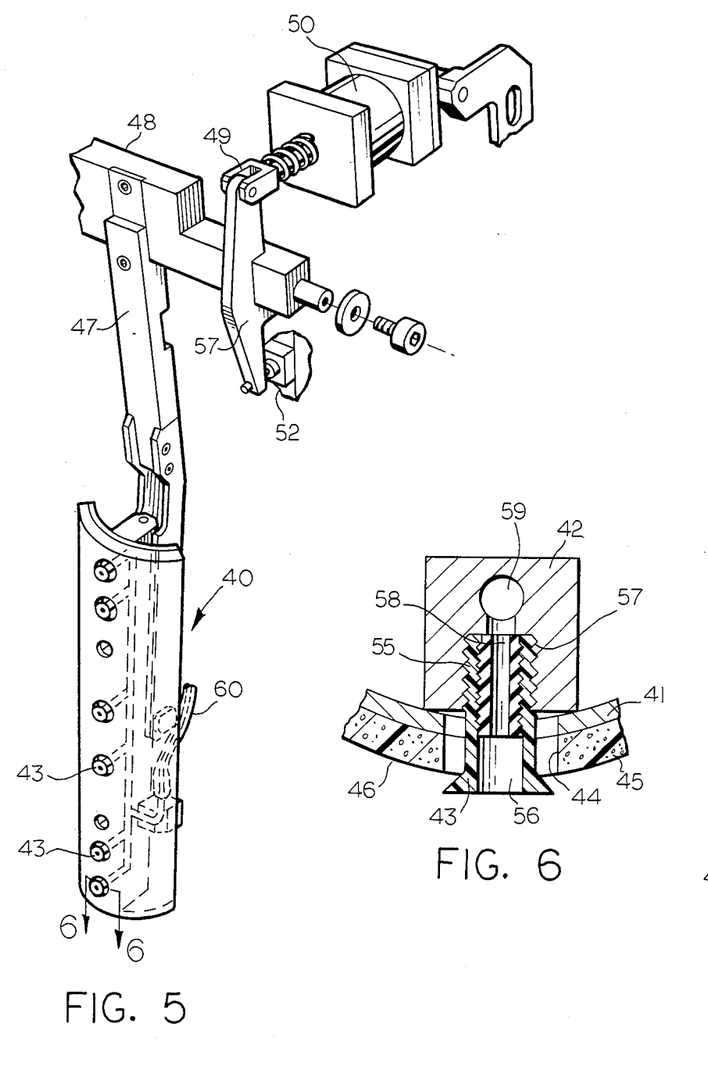
FIG. 5 is a fragmentary perspective view of a portion of the apparatus shown in FIG. 4.
FIG. 6 is a fragmentary sectional view on an enlarged scale taken along the line 6—6 in FIG. 5.
Figure 7:
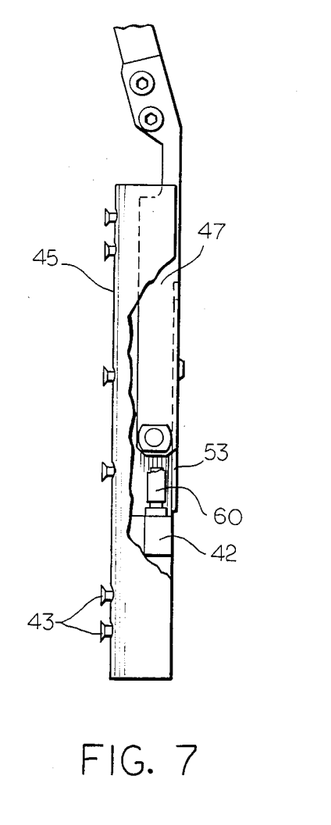
FIG. 7 is a part sectional view of a portion of the apparatus shown in FIG. 5.

As shown in FIG. 6, the vacuum cups 43 are also made of a resilient material such as silicone rubber having a durometer of 40-50 on the A scale. The cups 43 project beyond the outer surface 46 of the pad 45.

Figure 4:
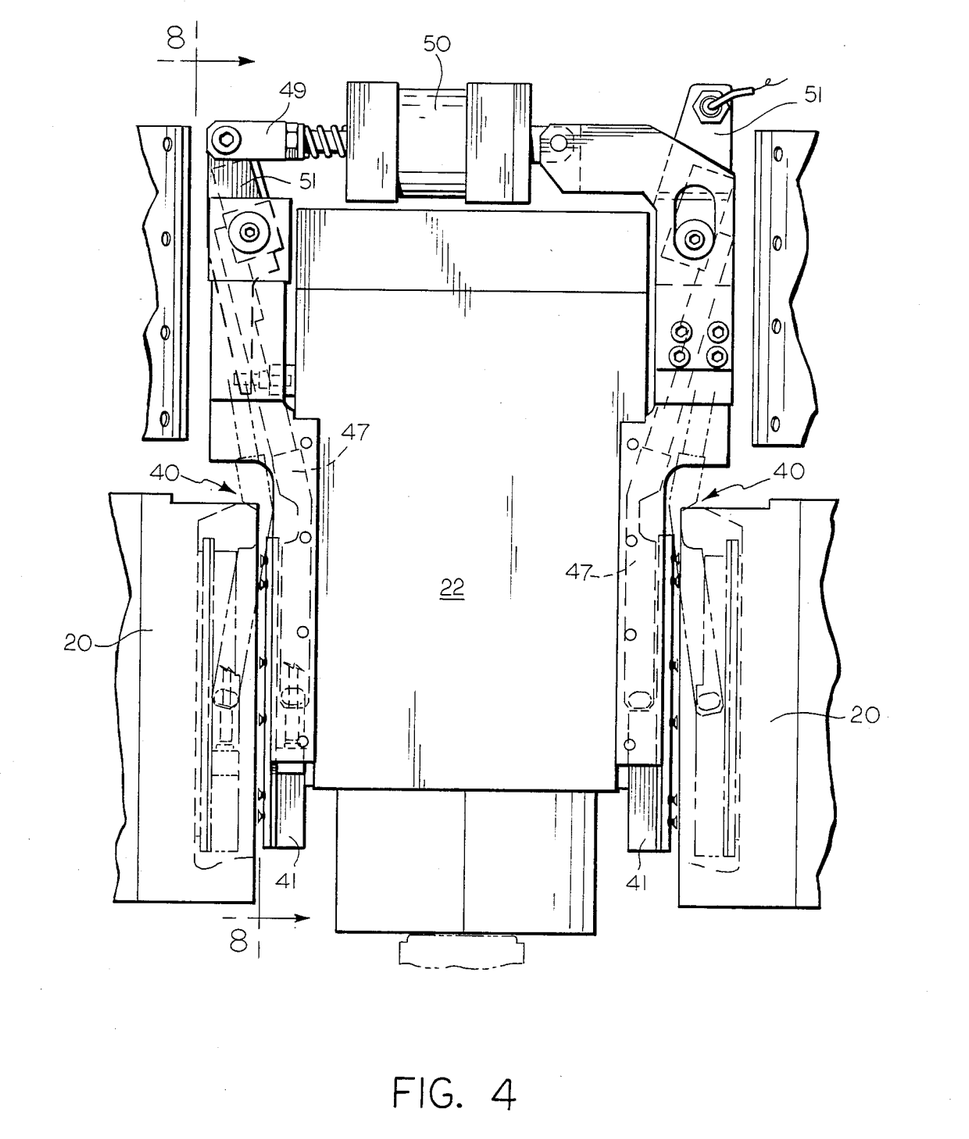
FIG. 4 is a fragmentary elevational view on an enlarged scale of the apparatus for picking up from a conveyor and delivering the labels to open partible molds.

Each vacuum device 40 is mounted for pivotal movement about a horizontal axis intermediate its ends on an arm 47 which, in turn, is mounted on a transverse shaft 48 for swinging movement that supports an array of vacuum devices 40. The piston 49 of a pneumatic motor 50 is connected to a lever 51 for swinging the pad outwardly toward a conveyor to pick up a label and inwardly and thereafter outwardly again to deliver the label to the mold. An adjustable stop 52 is provided for adjusting the movement of the pickup devices 40.

Figure 8:
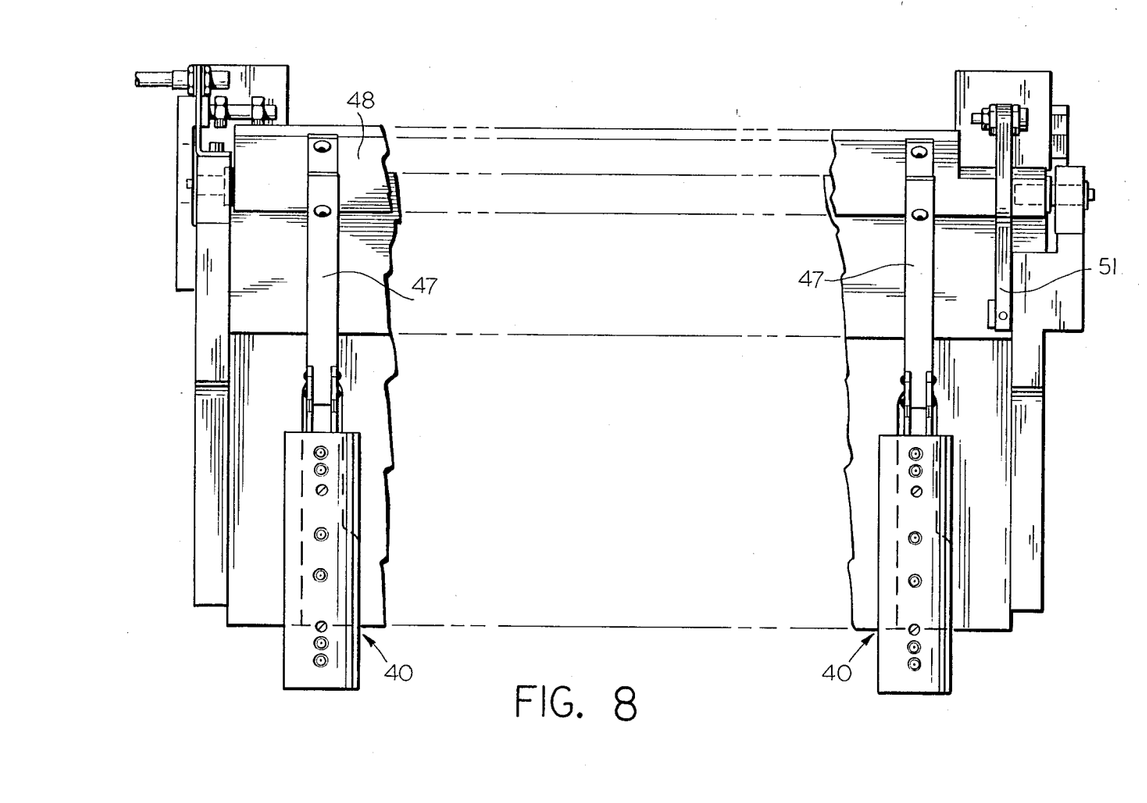
FIG. 8 is a side elevational view of the apparatus taken along the line 8—8 in FIG. 4.
Figure 9:
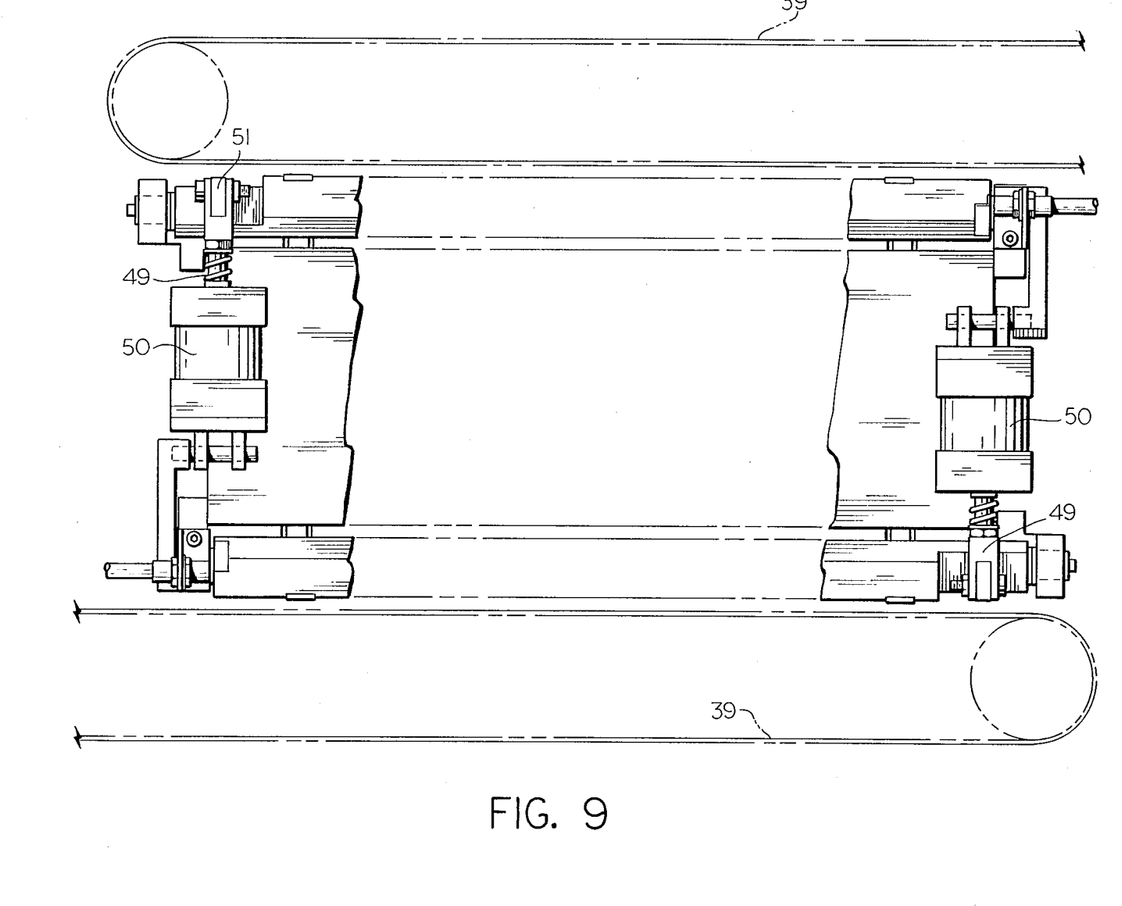
FIG. 9 is a fragmentary plan view of a portion of the apparatus shown in FIG. 4.
Figure 10:
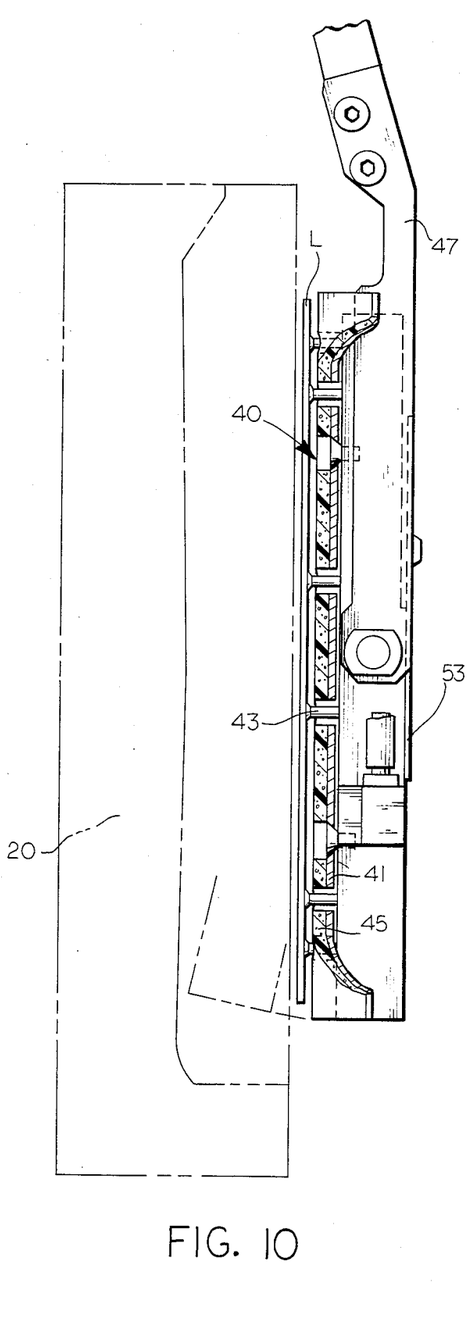
FIGS. 10 and 11 are sectional views on an enlarged scale similar to FIG. 9 showing the relative position of the label devices and the molds.

As shown in FIG. 8, the devices 40 are simultaneously moved to pick up an array of labels from the conveyor 39 and thereafter the head is moved between the molds so that actuation of the devices 40 will deliver the labels to the partible molds.

A spring 53 is provided for holding the body in vertical position when it is not in engagement with the mold.

Each vacuum cup 43 is held in position by a metal sleeve 55 that has a threaded exterior and projects through an opening 56 in the vacuum cup so that when the sleeve is threaded into the vacuum cup, it deforms the side wall of the vacuum cup into engagement with threads 57 in the block 42. The opening 56 of the vacuum cup 43 is aligned with opening 58 of sleeve 55 and, in turn, connects to a vacuum passage 59 connected by a pipe 60 to a source of vacuum.

Figure 11:
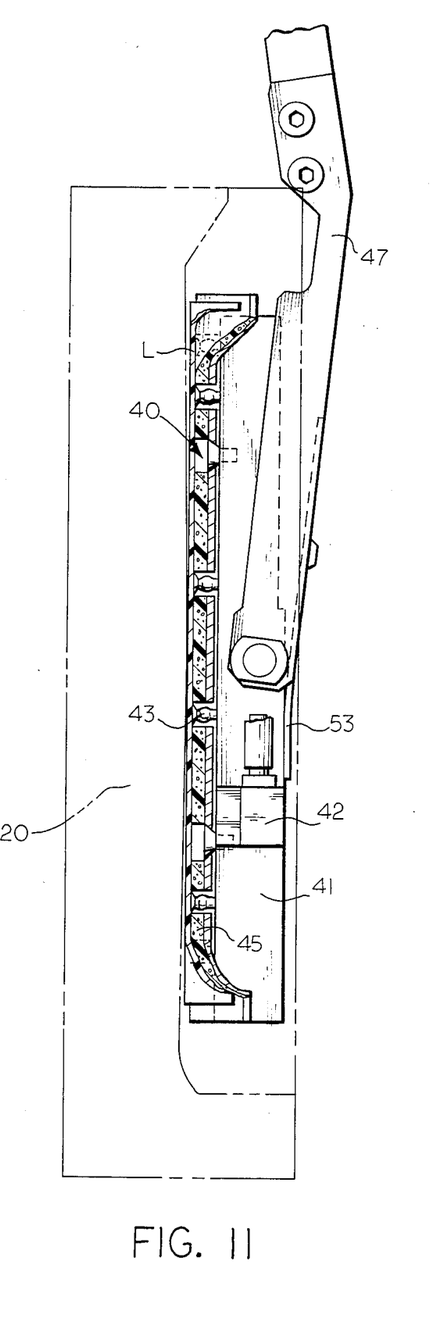

Spring 53 is in the form of a leaf spring and extends from arm 47 and has a free end engaging the block. As shown in FIGS. 4, 7, 9 and 10, each spring 53 holds the pickup body 41 generally vertical. When the array of bodies 41 are moved inwardly to deliver an array of labels L in the mold cavities 20, the lower end of the bodies 40 first engage the lower part of the cavity, as shown in broken lines in FIG. 10, and then the bodies 40 pivot relative to arms 47 to bring the labels L into engagement with the mold cavities 20, as shown in FIG. 11, and compressing the vacuum pads 43 axially. The mold cavities are provided with vacuum passages P for retaining the labels as is well known in the art.

Figure 12:
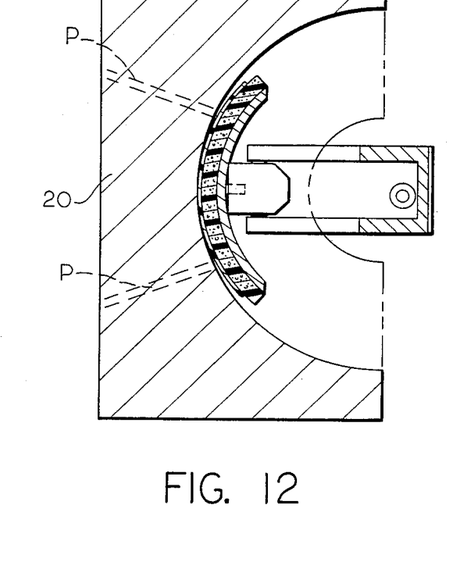
FIGS. 12, 13 and 14 are transverse cross sections showing the relationship of the label devices and molds having different mold cavities.
Figure 13:
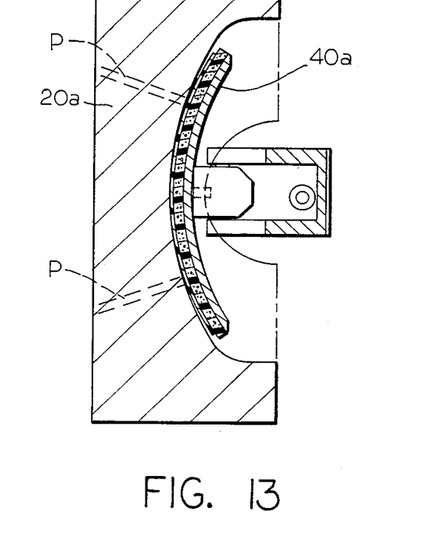
Figure 14:
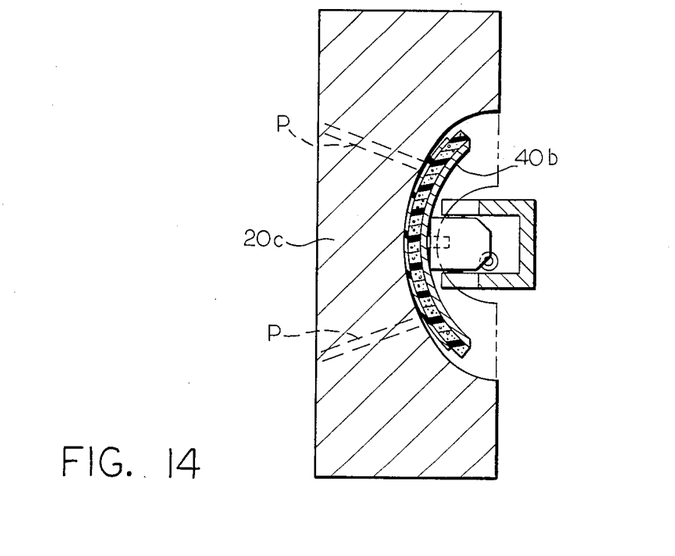

The transverse cross section of the body 41 and the layer 45 has a slightly less curvature than the corresponding transverse cross section of the cavity of the mold 20 (FIG. 12). Where the molds 20a, 20b are oval, the configuration of the section of the body 40a or 40b is also of lesser curvature (FIGS. 13, 14, respectively).

It can thus be seen that there has been provided an apparatus including a pickup and delivery device which will effectively hold the label and prevent it from becoming folded or deformed during the handling; which apparatus is simple and can be readily manufactured and maintained.

I claim:

1. In the making of hollow plastic articles wherein a label is positioned in each of a plurality of spaced partible molds in a predetermined array, a preform is positioned in each set of partible molds and the molds are closed and the preforms are blown outwardly to the confines of the molds to apply the label to a resultant hollow plastic article, the apparatus for removing the labels from a source and applying them to the open partible molds which comprises a vacuum device,
means for supporting the vacuum device for movement between a position for picking up a label and a position for delivering a label to a partible mold,
said vacuum device comprising an elongated body,
a plurality of longitudinally spaced vacuum cups on said body,
said body having a transverse cross sectional surface that generally conforms to the cross section of the internal surface of the partible mold to which the label is to be applied,
the outer surface of said body being formed with a layer of resilient material with the vacuum cups projecting slightly beyond the outer surface of said layer.

2. The apparatus set forth in claim 1 wherein said body has a plurality of openings, said vacuum cups being mounted in said openings.

3. The apparatus set forth in claim 2 wherein said means for supporting each said body comprises an arm, said body being pivoted to said arm.

4. The apparatus set forth in claim 3 including spring means yieldingly urging said body toward a predetermined position relative to said arm.

5. The apparatus set forth in claim 4 wherein said spring means comprises a leaf spring.

6. The apparatus set forth in claim 4 wherein said arms are mounted on a rotatable shaft for movement in an array.

7. The apparatus set forth in claim 1 wherein said layer comprises resilient foam material.

8. The apparatus set forth in claim 1 wherein said vacuum cups are made of compressible material and are constructed and arranged such that they are axially compressible.

9. The apparatus set forth in clam 1 wherein each said vacuum cup includes a tubular portion, said body having a threaded opening into which said tubular portion extends, and a threaded sleeve compressing said tubular portion of said vacuum cup onto said threads of said opening.

10. In the making of hollow plastic articles wherein a label is positioned in each of a plurality of spaced partible molds in a predetermined array, a preform is positioned in each set of partible molds and the molds are closed and the preforms are blown outwardly to the confines of the molds to apply the label to a resultant hollow plastic article, the apparatus for removing the labels from a source and applying them to the open partible molds which comprises a vacuum device, means for supporting the vacuum device for movement between a position for picking up a label and a position for delivering a label to a partible mold, said vacuum device comprising an elongated body, a plurality of longitudinally spaced vacuum cups on said body, said body having a transverse cross sectional surface that generally conforms to the cross section of the internal surface of the partible mold to which the label is to be applied, said body having a plurality of openings, said vacuum cups being mounted in said openings, the outer surface of said body being formed with a layer of resilient material with the vacuum cups projecting slightly beyond the outer surface of said layer, said vacuum cups being made of compressible material and constructed and arranged such that they are axially compressible.

11. The apparatus set forth in clam 10 wherein each said vacuum cup includes a tubular portion, said body having a threaded opening into which said tubular portion extends, and a threaded sleeve compressing said tubular portion of said vacuum cup onto said threads of said opening.

12. The apparatus set forth in claim 10 wherein said layer comprises resilient foam material.

13. The apparatus set forth in claim 10 wherein said means for supporting each said body comprises an arm, said body being pivoted to said arm.

14. The apparatus set forth in claim 13 including spring means yieldingly urging said body toward a predetermined position relative to said arm.

15. The apparatus set forth in claim 14 wherein said spring means comprises a leaf spring.

16. The apparatus set forth in claim 15 wherein said arms are mounted on a rotatable shaft for movement in an array.

* * * * *